July 16, 1968　　　　F. VAN GORP　　　　3,392,594

RUBBER LAGGED WING PULLEY

Filed April 15, 1966

INVENTOR
FRANKLIN VAN GORP
BY
T. Robert Henderson
ATTORNEY

United States Patent Office 3,392,594
Patented July 16, 1968

3,392,594
RUBBER LAGGED WING PULLEY
Franklin Van Gorp, Pella, Iowa 50219
Filed Apr. 15, 1966, Ser. No. 542,787
5 Claims. (Cl. 74—230.6)

ABSTRACT OF THE DISCLOSURE

This invention relates to a pulley having a plurality of radially extended, arcuately spaced wings the outer edges of which have elongated, straight holders retaining elongated resilient lags therein, which lags fall on the periphery of the pulley, and which lags have a plurality of particularly formed grooves in their outer gripping surfaces for providing angularly related, separate leading edges in each lag for increasing the gripping character of the pulley and for providing a self-cleaning of the lags thereof.

---

An object of this invention is to provide a resilient lag for a wing type pulley which increases the gripping characteristic thereof.

Another object of this invention is the provision of a resilient lag for a wing type pulley which provides better traction between the belt and the pulley.

A further object of this invention is the provision of a resilient lag for a wing type pulley which increases the self-cleaning characteristic of the lag.

Yet another object of this invention is to provide a resilient lag wherein the formation thereof enhances the resilient characteristic thereof thus providing better traction between the belt and the pulley, increases the self-cleaning characteristic of the lag and the frictional grab between the pulley and the belt, and thereby decreases wear on the belt.

A still further object of this invention is the provision of a resilient lag which is economical to manufacture, extremely effective in operation, and simple but rugged in construction.

These objects, and other features and advantages of this invention will become readily apparent by reference to the following description when taken in conjunction with the accompanying drawings, wherein.

Figure 1:
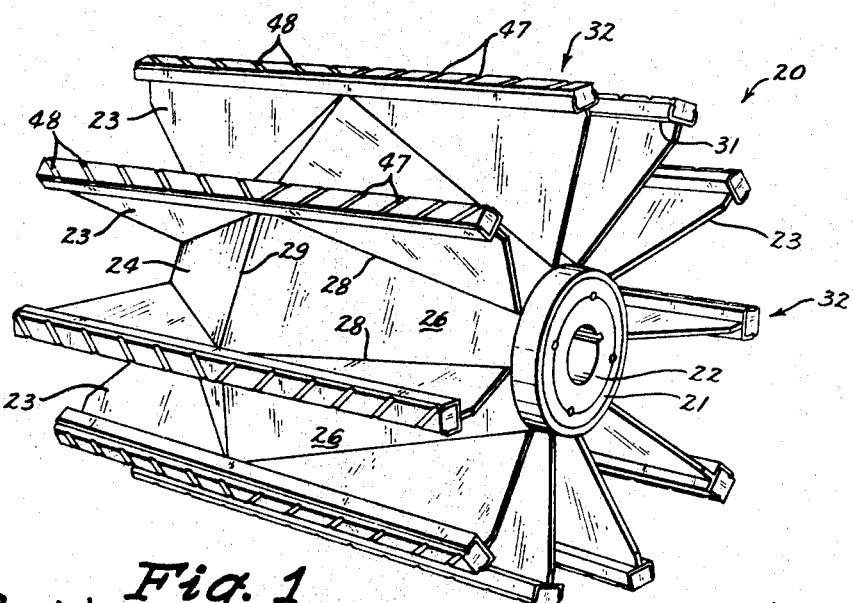
FIG. 1 is a perspective view of a wing pulley showing an embodiment of this invention applied thereto.

Referring now to the drawings, a wing type pulley is indicated generally at 20 in FIG. 1 and is comprised of a hub 21 having bushings 22 at each end (only one showing). A plurality of flat, generally truncated plates or wings 23 are secured lengthwise along their shorter sides (not seen) to the hub 21 in a radially spaced manner. To stabilize the wings, a pair of flat, truncated gusset plates 24 and 26 are provided.

Each plate 24 and 26 is secured, as by welding at its narrower end 27 to the hub 21 at an end thereof, and along the sides 28 of the respective plate to adjacent wings 23 in an inclined manner relative to the longitudinal axis of the hub 21. The wide ends 29 of each pair of plates 24 and 26 abut at the longitudinal center of the hub 21, as best illustrated in FIG. 1, and are secured together as by welding.

Figure 3:
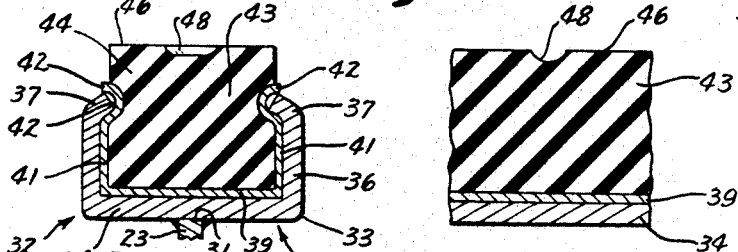
FIG. 3 is a sectional view as taken along the line 3—3 in FIG. 2.

Along the outer side or face 31 of each wing 23, an elongated lag holder device, indicated generally at 32 in FIGS. 1 and 3, is provided. As the devices 32 are identical, only one will be described with like parts indicated by like reference numerals. It should be remembered, that although the faces or crowns 31 are illustrated as being straight, they may be crowned according to the practice in the pulley art.

The lag holder device 32 (FIGS. 1 and 3) includes an elongated one piece holder 33, U-shaped in cross section and having a flat base 34 and a pair of laterally spaced parallel sidewalls or legs 36 extended at right angles to the base 34. The upper edge 37 of each sidewall 36 is bent inwardly from the main plane of the sidewall at an inclined angle, whereby the edges 37 are inclined toward each other.

Mounted within the holder 33 and retained particularly by the reversely inclined edges 37 is a lag retainer 38 (FIG. 3) which is approximately the same length as the holder 33. The retainer 38 is U-shaped in cross section and includes a flat base 39 and a pair of spaced, parallel sidewalls or legs 41 extended at right angles to the base 39. The retainer sidewalls 41 (FIG. 3) terminate at their upper edges in semi-circularly formed flanges 42, the outer surfaces of which face outwardly thus forming grooves into which the holder edges 37 extend.

Seated within the retainer 38 and retained particularly by the flanges 42, is a lag 43 (FIGS. 1 and 3). The lag 43, formed from a bar of resilient material, such as hard rubber, is approximately the same length as the retainer 38 and the holder 33, and is substantially square in cross section (FIG. 3). To provide the upper gripping portion 44 of the lag 43, the height of the sidewalls 36 and 41 (FIG. 3) is less than the height of the lag 43, whereby the outer surface 46 (FIG. 3) of the lag is thus free for resilient contact with a belt (not shown). For complete information on the method of forming my lag holder device as to the elements thus far described, reference may be had to my U.S. Pat. No. 3,168,781, issued Feb. 9, 1965.

Figure 2:
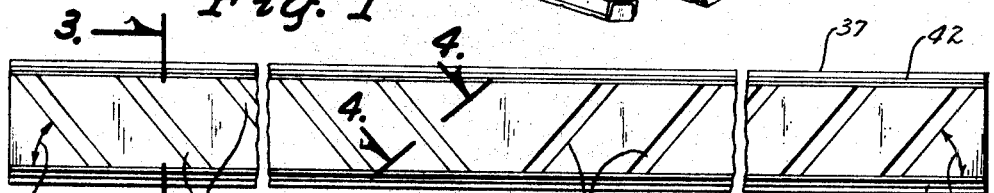
FIG. 2 is an enlarged, foreshortened plan view of the resilient lagging.
Figure 4:
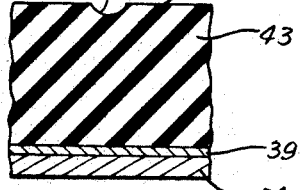
FIG. 4 is a fragmentary sectional view as taken along the line 4—4 in FIG. 2.

The invention pertains to a plurality of grooves 47 and 48 (FIGS. 1 and 4) which are formed in the surface 46 of the lag portion 44, and extend laterally across the surface 46. As best noted in FIG. 2, the grooves 47 are formed in parallel relation across one half the length of the lag 43, and are inclined relative to the longitudinal axis of the lag 43 (see FIG. 2). The grooves 48, formed in the other half of the lag surface 46 are also parallel, and slant at an angle which is supplementary with the angle of inclination of the grooves 47. The purpose of the supplementary positioning of the two sets of grooves is to hold the belt centrally on the pulley 20.

In a lag 43 having approximately a one inch height and a one and one-eighth inch width, it is recommended that the width of each groove 47 be approximately one-fourth inch, and that the depth be approximately three-sixteenth of an inch. It is also recommended that each groove 47 be spaced from an adjacent groove 47 about two inches, and that the angle A be approximately fifty degrees (50°). These recommendations pertain also to the grooves 48.

In use, the pulley 20 (FIG. 1) is adapted to drive a continuous belt (not shown) with the outer surfaces 46 (FIG. 3) of the resilient lags 43, which define the periphery of the pulley 20, coming into gripping contact with the belt. The resilient nature of the lags 43 provides for a generally positive gripping action on the belt; however with the provision of the grooves 47 and 48, the resiliency is increased and a greater positive gripping action is created, thereby enabling the application of more torque to the pulley. Rather than having a single leading edge for gripping purposes, a plurality of leading edges are provided. It has also been found that due to the presence of the grooves 47 and 48, less slippage occurs thus minimizing the wear on the belt.

Additionally, the resiliency of the lags 43 tends to provide a self-cleaning of foreign objects which tend to build up between the pulley and the belt. The deformation of the lags 43 with the grooves 47 and 48 formed therein, increase the self-cleaning characteristic and enhances the efficiency of the pulley and the life of the belt. The self-cleaning occurs when the belt leaves the pulley 20, whereupon the upper portion 44 of the lag 43, which has been under a twisting stress during its engagement with the belt, snaps back into normal relation with the retained remainder of the lag 43, thus cleaning the entire surface 46 of the lag 43. By providing a plurality of grooves, the foreign material can slush into the grooves to leave the face clean.

Figure 5:
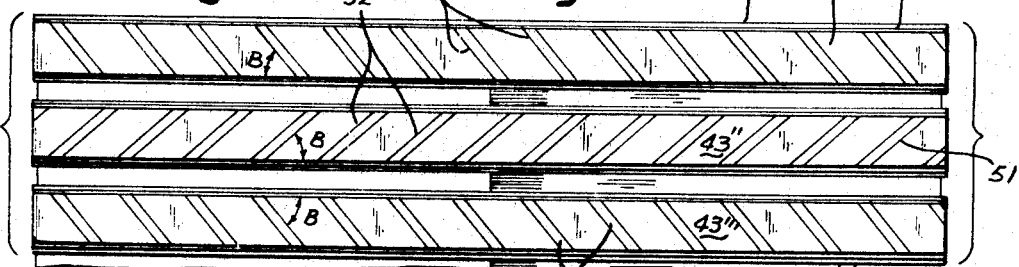
FIG. 5 is a plan view of a modified embodiment of the resilient lagging.

A modified embodiment of the lag 43' is depicted in FIG. 5, with like parts indicated by like reference numerals. Therein, the grooves 51 formed on the face of each lag are all parallel as they extend laterally across the complete surface 46', and are therefore slanted at the same angle relative to the longitudinal axis of the lag. The installation of the modified embodiment requires that the inclination of the grooves on alternate lags are reversed; that is, the grooves 51 on lag 43' must slant at approximately 90° to the grooves 52 on lag 43'', and with the grooves 53 on the next lag 43'' again be reversed, being thereby parallel to the grooves 51, etc.

Although a preferred embodiment and one modification of this invention has been described and disclosed hereinbefore, it is to be remembered that various other modifications and alternate constructions can be made thereto without departing from the true spirit and scope of the invention as defined in the appended claims.

I claim:
1. A wing pulley for driving a continuous belt comprising in combination:
   a hub;
   a plurality of plates secured to said hub in arcuately spaced relation and extended radially therefrom;
   lag holding means secured to each plate; and
   an elongated resilient lag having an outer surface for resilient contact with the belt, said lag seated in and retained by said holding means;
   said outer surface having a plurality of angularly related, separate leading edges formed therein for individually gripping a belt upon coming into contact therewith.

2. A wing pulley as defined in claim 1, and further wherein said leading edges are formed by a plurality of angularly related grooves formed in said outer surface.

3. A wing pulley as defined in claim 2, and further wherein said grooves are formed in laterally spaced relation across the surface of said lag, and extend from one side of said surface to the other side thereof at an angle relative to the longitudinal axis of said lag.

4. A wing pulley as defined in claim 3, and further wherein said groves comprise a first set of grooves disposed in one-half of said leg which are parallel to each other and slanted relative to the longitudinal axis of said lag, and a second set of grooves disposed in the other half of the length of said lag which grooves of said second set are parallel to each other and slanted at an angle to form intersecting lines with the angle of slant of said first set of grooves.

5. A wing pulley as defined in claim 2, and further wherein all of said grooves formed in the face of each lag are formed parallel to each other, and with the grooves formed in the faces of each adjacent pair of lags extended to form intersecting lines therebetween.

References Cited
UNITED STATES PATENTS

| | | | |
|---|---|---|---|
| 2,082,684 | 6/1937 | Chachula | 74—230.6 |
| 2,628,709 | 2/1953 | Steinmetz | 74—230.6 X |
| 2,673,470 | 3/1954 | Cosmos | 74—230.7 |
| 2,788,969 | 4/1957 | Binder. | |
| 3,033,050 | 5/1962 | Hisserich | 74—229 |
| 3,046,805 | 7/1962 | Van Gorp | 74—230.7 |
| 3,220,272 | 11/1965 | Beausoleil | 74—230.6 |

FRED C. MATTERN, JR., *Primary Examiner.*

J. A. WONG, *Assistant Examiner.*